(12) United States Patent
Arai et al.

(10) Patent No.: US 6,981,771 B1
(45) Date of Patent: Jan. 3, 2006

(54) REAR PROJECTION DISPLAY DEVICE

(75) Inventors: Kazuhiro Arai, Kadoma (JP); Syoichi Yoshii, Fujiidera (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/608,067

(22) Filed: Jun. 30, 2000

(30) Foreign Application Priority Data

| Jul. 1, 1999 | (JP) | ................................. 11-187893 |
| Jul. 1, 1999 | (JP) | ................................. 11-187894 |

(51) Int. Cl.
 *G03B 21/22* (2006.01)
 *G03B 21/28* (2006.01)
 *G03B 21/14* (2006.01)
 *G03B 21/56* (2006.01)
 *G02F 1/1335* (2006.01)

(52) U.S. Cl. ............................. 353/74; 353/8; 353/20; 353/31; 353/34; 353/37; 353/71; 353/77; 349/7; 349/8; 349/9; 359/460

(58) Field of Classification Search ................. 353/77, 353/29, 74, 71, 119, 31, 33–34, 37, 20, 8; 349/5, 7–9, 458; 359/460
See application file for complete search history.

(56) References Cited

U.S. PATENT DOCUMENTS

| 4,200,365 | A | | 4/1980 | Keondjian et al. ............ 353/29 |
| 4,516,837 | A | * | 5/1985 | Soref et al. .................. 350/347 |
| 4,544,946 | A | * | 10/1985 | VanBreemen ................. 358/60 |
| 4,995,718 | A | * | 2/1991 | Jachimowicz et al. ......... 353/31 |
| 5,048,949 | A | | 9/1991 | Sato et al. ..................... 353/77 |
| 5,090,800 | A | | 2/1992 | Ushiro ......................... 353/71 |
| 5,097,323 | A | * | 3/1992 | Sato et al. .................. 348/761 |
| 5,285,287 | A | * | 2/1994 | Shikama ..................... 348/745 |
| 5,477,394 | A | * | 12/1995 | Shibazaki .................... 359/858 |
| 5,506,642 | A | * | 4/1996 | Suzuki et al. ................. 353/74 |
| 6,082,861 | A | * | 7/2000 | Dove et al. ................... 353/20 |
| 6,089,718 | A | * | 7/2000 | Hashizume ................... 353/31 |
| 6,152,566 | A | * | 11/2000 | Hashizume ................... 353/20 |
| 6,217,174 | B1 | * | 4/2001 | Knox .......................... 353/31 |
| 6,250,764 | B1 | * | 6/2001 | Aoki et al. ................... 353/31 |
| 6,343,864 | B1 | * | 2/2002 | Tajiri ........................... 353/20 |
| 6,379,010 | B1 | * | 4/2002 | Suzuki et al. ................. 353/31 |
| 6,626,540 | B2 | * | 9/2003 | Ouchi et al. .................. 353/31 |
| 6,805,447 | B2 | * | 10/2004 | Takeuchi ..................... 353/71 |

FOREIGN PATENT DOCUMENTS

| JP | 01120192 | * 5/1989 |
| JP | 07-281178 | 10/1995 |
| JP | 09-093598 | 4/1997 |
| JP | 11-504441 | 4/1999 |
| WO | WO 96/37806 | 11/1996 |
| WO | WO 99/13378 | 3/1999 |

* cited by examiner

*Primary Examiner*—W. B. Perkey
*Assistant Examiner*—Magda Cruz
(74) *Attorney, Agent, or Firm*—Arent Fox PLLC

(57) ABSTRACT

A rear projection display device improves the brightness by improving the utilization efficiency of image light projected to a screen from slantly below. At least a green component of the image light is P-polarized to the screen (7). Therefore, reflection of light on the screen (7) is reduced.

16 Claims, 8 Drawing Sheets

Fig.7 reflectivity characteristic of light incident from acrylic resin to air (refractive index=1.492)

REAR PROJECTION DISPLAY DEVICE

BACKGROUND OF THE INVENTION

1. Field of the Invention

This invention relates to a rear projection display device which enables an observer to observe a picture on a front surface of a screen by slanting projecting image light onto a back surface of a screen.

2. Description of the Prior Art

Figure 9:
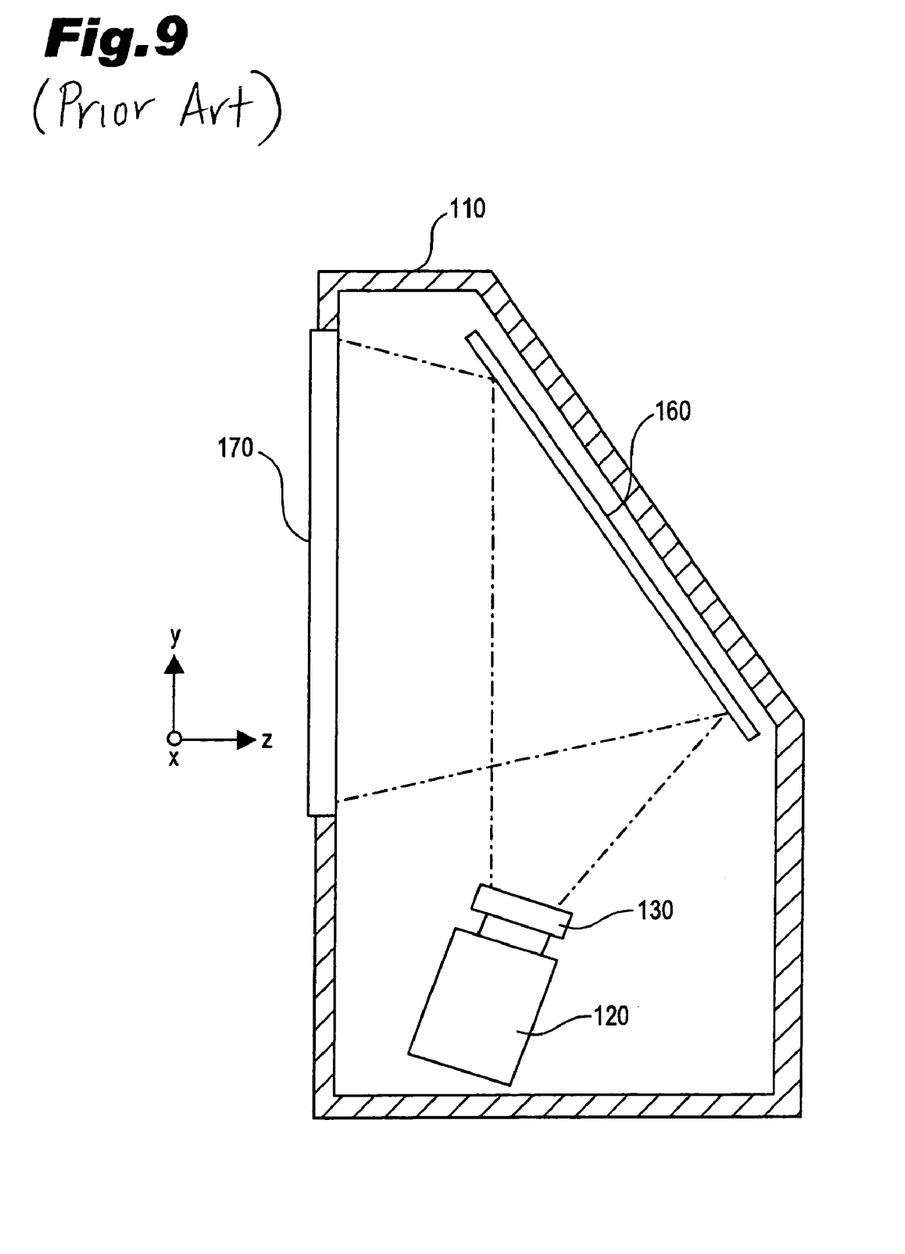
FIG. 9 is a cross sectional view illustrating a structure of a conventional rear projection display device.
Figure 10:
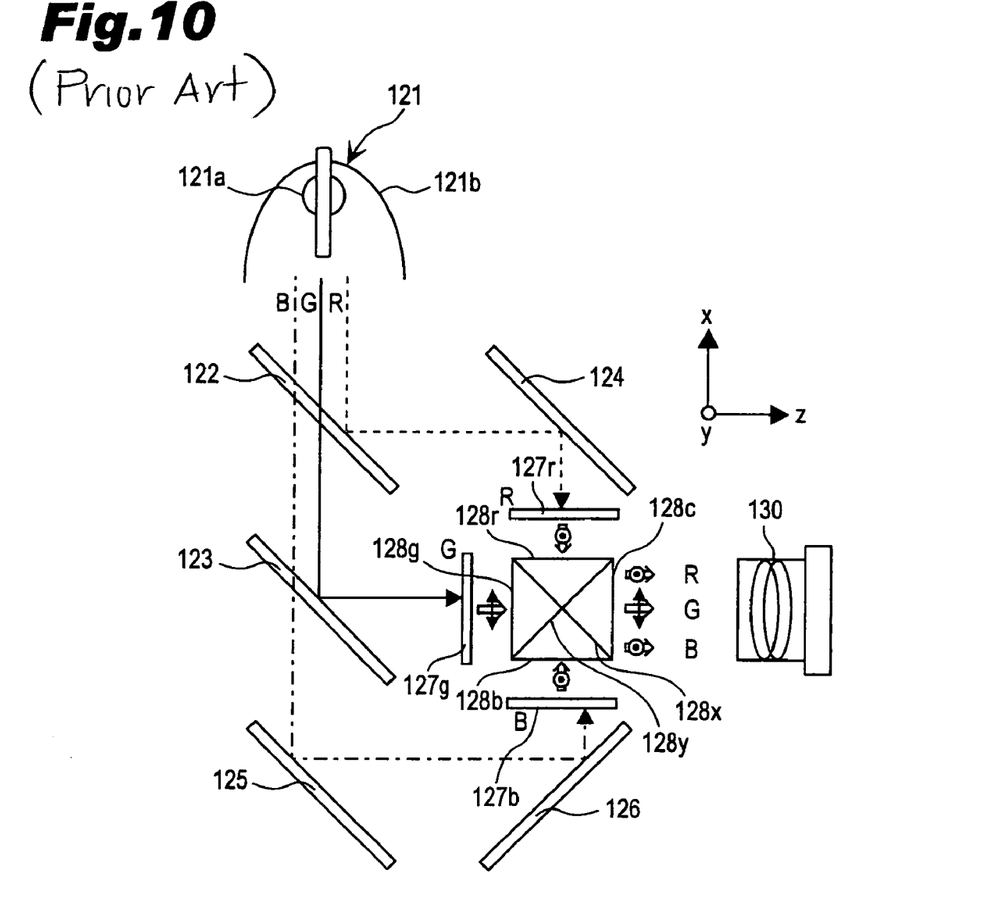
FIG. 10 is a top plan view of a projection unit of the rear projection display device of FIG. 9.
Figure 11:
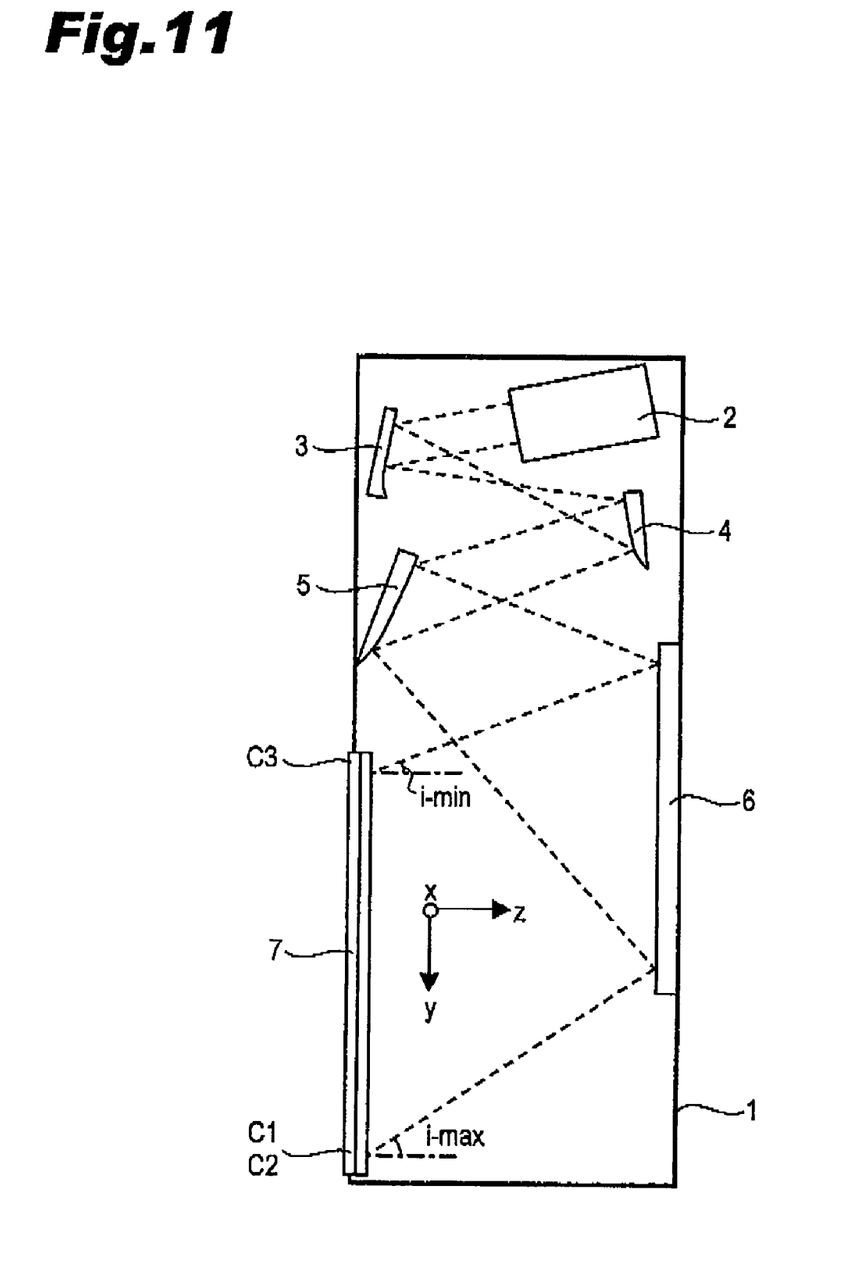
FIG. 11 illustrates one example of a rear projection display device.

FIGS. 9, 10 illustrate one example of a conventional rear projection display device. Specifically, FIG. 9 illustrates a cross sectional view of a conventional rear projection display device, and FIG. 10 illustrates a top plan view of the rear projection display device shown in FIG. 9. In the following description, a coordinate system is used where a horizontal direction of a rectangle screen 170 is taken along an x-axis, a vertical direction of the screen 170 is taken along a y-axis, and a perpendicular direction to the screen 170 is taken along a z-axis.

The rear projection display device of FIG. 9 includes: a projection unit 120 arranged in a body 110; a projection lens 130 arranged on a light emitting opening of the projection unit 120; a reflecting mirror 160 arranged on an inner back surface of the body 110; and a transmission type diffusing screen 170 arranged on the front of the body 110. Image light, which is magnified and projected from the projection unit 120 through the projection lens 130, is reflected on the reflecting mirror 160 and is irradiated onto a back surface of the diffusing screen 170. A picture is observed on the front surface of the diffusing screen 170.

As shown in FIG. 10, the projection unit 120 includes a white light source 121 comprising a lamp 121a and a reflector 121b. Dichroic mirrors 122, 123 split the white light emitted from the white light source 121 into three colors of light. A first dichroic mirror 122 selectively reflects light of a red component (referred as "red light" hereinafter) out of the white light emitted from the lamp 121a and transmits the light of the other color components. A second dichroic mirror 123 selectively reflects light of a green component (referred as "green light" hereinafter). The green light from the light transmitted through the first dichroic mirror 122 is selectively reflected on the second dichroic mirror 123 and is introduced to a liquid crystal panel 127g. Light of a blue component (referred as "blue light" hereinafter), from the light transmitted through the second dichroic mirror 123, is introduced to a liquid crystal panel 127b for the blue light by reflecting mirrors 125, 126. The red light reflected on the first dichroic mirror 122 is introduced to a liquid crystal panel 127r by the first reflecting mirror 124.

The color lights are modulated at the liquid crystal panels 127r, 127g, and 127b, respectively, and are synthesized at a dichroic prism 128 and subsequently emitted to the projection lens 130.

Incident directions of the color lights modulated at the liquid crystal panels 127r, 127g, and 127b to the dichroic prism 128 are set with the consideration of color reproducibility at the dichroic prism 128. Light reflected on the dichroic prism 128 is S-polarized light, and light transmitted through the dichroic prism 128 is P-polarized light.

The S-polarized light is a linearly polarized light wherein the oscillation direction of the electric vector of the light incident to a sample surface, is vertical to a surface including a normal of the sample surface and a normal of a wave surface which is a light traveling direction. The P-polarized light is a linearly polarized light wherein the oscillation direction of the electric vector of the light incident to a sample surface, is included in an incident surface (a surface including a normal of the sample surface and a light traveling direction).

Specifically, the red light from the light incident to the dichroic prism 128 is set to be S-polarized to a bonded surface 128x. A polarized light component, which is perpendicular to an x-z plane, is reflected on the bonded surface 128x. The green light is set to be P-polarized light to the bonded surfaces 128x, 128y. A polarized light component, which is parallel to the x-z plane, is transmitted through the bonded surface 128x, 128y. The blue light is set to be S-polarized light to the bonded surface 128y. A polarized light component, which is perpendicular to the x-z plane, is reflected on the bonded surface 128y. And then the red, green, and blue light is color-synthesized.

The color-synthesized image light is irradiated from the projection lens 130 to the back surface of the screen 170 through the reflecting mirror 160.

Recently, a rear projection display device capable of slantly irradiating image light to the screen 170 for reducing the depth of the device was proposed. When the above mentioned projection unit 120 was used for projecting an image from a slanted angle, a polarization direction of the projected image light to the screen 170 was set in the direction orthogonal with the polarization direction of the image light to the dichroic prism 128. The red light was P-polarized, the green light was S-polarized, and the blue light was P-polarized.

Figure 6:
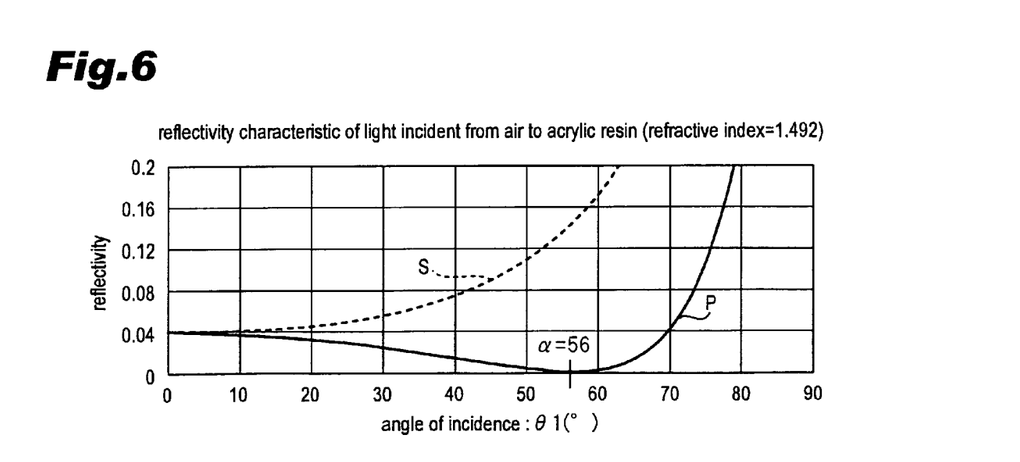
FIG. 6 is a graph of the reflectivity characteristic of light incident to acrylic resin from the air.

When the image light was projected onto the screen 170 on a slant, the light was incident to the acrylic resin from an air with a certain angle of incidence out of a vertical incidence. FIG. 6 is a table showing the reflectivity characteristics of light incident to the acrylic resin from the air. As shown in FIG. 6, when the image light was projected onto the screen 170 on a slant, the reflectivity of P-polarized light to the screen 170 was lowered while the reflectivity of S-polarized light to the screen 170 increased.

Figure 8:
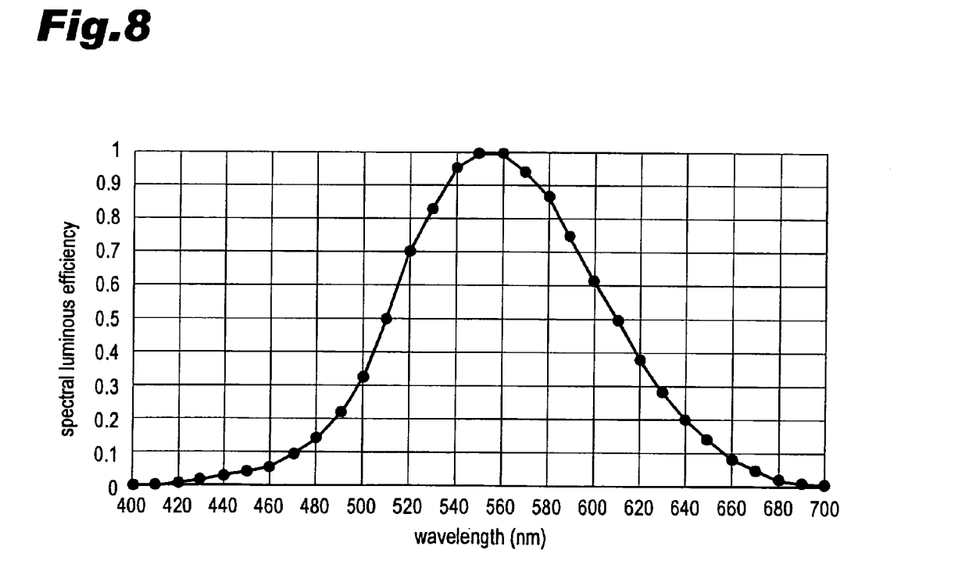
FIG. 8 is a graph of spectral luminous efficiency characteristics of a man.

FIG. 8 presents the spectral luminous efficiency characteristics of a man. As shown in FIG. 8, the spectral luminous efficiency of a man's eyes is the highest at around a wavelength of 555 nm which corresponds to the green color, and therefore, a man is more likely to recognize green light being brighter in comparison with red and blue light.

As a result, when the image light was projected by using the conventional projection unit 120, the reflectivity of the brightest green light at the screen 120 increases, and the brightness as a whole is lowered. Furthermore, the image quality is degraded because of the reflected light.

SUMMARY OF THE INVENTION

The present invention was made to solve the above problems and to provide a rear projection display device capable of improving brightness and image quality through the use of efficient image light that is projected onto a screen on a slant.

A rear projection display device of this invention comprises a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for projecting image light which is color-synthesized by the color synthesizing means on a screen from slantly above or from slantly below. A polarization direction of at least a green component out of the image light irradiated on the screen is parallel to a vertical cross section of the screen.

When image light is projected onto a screen either from slanting above or from slanting below, an angle, which is formed by a principal ray of light incident to the screen and a normal of the screen, (i.e. a perpendicular line to the screen) is larger in a vertical direction than in a horizontal direction. Therefore, when a polarization direction of a green component, of which spectral luminous efficiency for a man's eyes is high, is made parallel to a vertical cross section of the screen, less image light is reflected and lost on a back surface of the screen.

A polarization direction adjusting means is provided for adjusting a polarization direction of at least the green component of the image light, synthesized by the color synthesizing means, so that the polarization direction of at least the green component is parallel to the vertical cross section of the screen.

This structure ensures that a polarization direction of the green component of the image light is adjusted so as to be parallel to a vertical cross section of the screen when the polarization direction of the green light is not parallel to the vertical cross section.

It is preferred that the polarization directions of all the color components of the image light that are irradiated onto the screen, are parallel to the vertical cross section of the screen.

A polarization direction adjusting means is also provided for selectively adjusting a color component, of which a polarization direction is orthogonal to the vertical cross section of the screen, from the image light synthesized by the color synthesizing means, so that the polarization direction of the color component is parallel to the vertical cross section of the screen.

This structure ensures that a color component having a polarization direction orthogonal to a vertical cross section of the screen, is selectively adjusted so that the polarization direction is parallel to the vertical cross section of the screen.

A rear projection display device of this invention comprises a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for projecting image light which is color-synthesized by the color synthesizing means on a screen from a slant side. A polarization direction of at least a green component out of the image light irradiated on the screen is parallel to a horizontal cross section of the screen.

When image light is projected onto a screen on a slant, an angle, which is formed by a principal ray of light incident to the screen and a normal of the screen, is larger in a horizontal direction than in a vertical direction. Therefore, when a polarization direction of a green component, of which spectral luminous efficiency for a man's eyes is high, is made parallel to a horizontal cross section of the screen, less image light is reflected and lost on a back surface of the screen.

A polarization direction adjusting means is provided for adjusting a polarization direction of at least the green component from the image light irradiated onto the screen so that the polarization direction of at least the green component is parallel to the horizontal cross section of the screen.

This structure ensures that a polarization direction of the green component from the image light synthesized by the color synthesizing means, is adjusted to be parallel to a horizontal cross section of the screen even when the polarization direction of the green light is not parallel to the horizontal cross section.

It is preferred that the polarization directions of all the color components of the image light irradiated on the screen are parallel to the horizontal cross section of the screen.

A polarization direction adjusting means is provided for selectively adjusting a color component, from the image light synthesized by the color synthesizing means so that the polarization direction of the color component is parallel to the horizontal cross section of the screen. The polarization direction is orthogonal with the horizontal cross section of the screen.

This structure ensures that a polarization direction of a color component from the image light synthesized by the color synthesizing means is selectively adjusted so as to be parallel to a horizontal cross section of the screen.

A rear projection display device of this invention comprises a light source lamp, color splitting means for splitting light emitted from the light source lamp into a plurality of color components, a plurality of liquid crystal panels for optically modulating the light of each color split by the color splitting means, color synthesizing means for synthesizing each of the color light modulated by the liquid crystal panels, and projection means for slantly projecting image light which is color-synthesized by the color synthesizing means on a screen. A polarization direction of at least a green component out of the image light irradiated on the screen is parallel to a plane including the image light irradiated on the screen and a normal of the screen.

When image light is projected onto a screen on a slant, an angle, which is formed by a principal ray of light incident to the screen and a normal of the screen is maximum in a plane including the image light irradiated on the screen and a normal of the screen. Therefore, when a polarization direction of a green component, of which spectral luminous efficiency for a man's eyes is high, is made parallel to the plane including the image light irradiated on the screen and a normal of the screen, less image light is reflected and lost on a back surface of the screen.

A polarization direction adjusting means is provided for adjusting a polarization direction of at least the green component from the image light irradiated on the screen so that the polarization direction of at least the green component is parallel to the plane which includes the image light irradiated on the screen and the normal of the screen.

This structure ensures that a color component of which a polarization direction is orthogonal with a plane which includes image light irradiated on the screen and a normal of the screen out of the image light synthesized by the color synthesizing means, is selectively adjusted so that the color component is made parallel to a plane which includes the image light irradiated on the screen and the normal of the screen.

It is preferred that the polarization directions of all the color components of the image light irradiated on the screen are parallel to a plane which includes the image light irradiated on the screen and a normal of the screen (i.e., a perpendicular line to the screen).

A polarization direction adjusting means is provided for selectively adjusting a color component from the image light synthesized by the color synthesizing means so that the polarization direction of the color component is parallel to the plane including the image light irradiated on the screen and a normal of the screen. The polarization direction is orthogonal with the plane which includes the image light irradiated on the screen and the normal screen.

This structure ensures that a color component of which a polarization direction is orthogonal with a plane which includes image light irradiated on the screen and a normal of the screen out of the image light synthesized by the color synthesizing means, and is selectively adjusted so that the color component is made parallel to a plane which includes the image light irradiated on the screen and the normal of the screen (i.e., a perpendicular line to the screen).

The polarization direction adjusting means comprises a retardation plate and the projection means includes a plurality of aspherical mirrors functioning as a lens.

In a rear projection display device of this invention, the relation j-min<β<j-max is satisfied, wherein an angle of a maximum value (j-max) and a minimum value (j-min) are formed by a normal of a front surface of the screen and by a principal ray of the image light irradiated on the front surface of the screen, and an angle β is obtained when the reflectivity of light, having a polarization direction parallel to the vertical cross section of the screen, to the front surface of the screen is at a minimum.

In this structure, light having a polarization direction parallel to a vertical cross section of a screen is irradiated on a back surface of the screen at an angle α at which the reflectivity to a normal of a back surface of the screen is low.

In a rear projection display device of this invention, the relation j-min<β<j-max is satisfied, wherein an angle of a maximum value (j-max) and a minimum value (j-min) are formed by a normal of a front surface of the screen and by a principal ray of the image light irradiated on the front surface of the screen, and an angle β is obtained when the reflectivity of light, having a polarization direction parallel to the vertical cross section of the screen, to the front surface of the screen is at a minimum.

In this structure, light having a polarization direction parallel to a vertical cross section of a screen is irradiated onto a front surface of the screen at an angle including the angle β at which the reflectivity to a normal of a back surface of the screen at the back surface of the screen is low.

The screen includes a fresnel lens and the front surface of the screen is an inclined surface with a ring body shaped protrusion of the fresnel lens.

The polarization direction of at least the green component from the image light irradiated on the screen is parallel to the vertical cross section of the screen.

When a polarization direction of a green component is made parallel to a vertical cross section of the screen, less image light is reflected and lost on a back surface of the screen.

In a rear projection display device of this invention which image light is irradiated onto the back surface of the screen from a slant, and a picture is observed from the front surface of the screen, the relationship of i-min<α<i-max is satisfied, where an angle of a maximum value (i-max) and a minimum value (i-min) is formed by a normal of the back surface of the screen and by a principal ray of the image light irradiated on the back surface of the screen. The angle α is obtained when the reflectivity of light, having a polarization direction parallel to the horizontal cross section of the screen, to the back surface of the screen is at a minimum.

In this structure, light having a polarization direction parallel to a horizontal cross section of a screen is irradiated onto a back surface of the screen at an angle including the α angle at which the reflectivity to a normal of a back surface of the screen of the back surface of the screen is low.

In a rear projection display device of this invention, the relation j-min<β<j-max is satisfied, where an angle of a maximum value (j-max) and a minimum value (j-min) is formed by a normal of the front surface of the screen and by a principal ray of the image light irradiated on the front surface of the screen. The angle β is obtained when the reflectivity of light, having a polarization direction parallel to the horizontal cross section of the screen, to the front surface of the screen is at a minimum.

In this structure, light having a polarization direction parallel to a horizontal cross section of a screen is irradiated onto a front surface of the screen at an angle including the angle β at which the reflectivity to a normal of the back surface of the screen of the back surface is low.

The screen includes a fresnel lens and the front surface of the screen is an inclined surface with a ring body shaped protrusion of the fresnel lens.

The polarization direction of at least the green component from the image light irradiated onto the screen is parallel to the horizontal cross section of the screen.

When a polarization direction of the green component is made parallel to a horizontal cross section of the screen, less image light is reflected and lost on the back surface of the screen.

In a rear projection display device of this invention, the relationship of j-min<β<j-max is satisfied, where an angle of a maximum value (j-max) and a minimum value (j-min) is formed by a normal of a front surface of the screen and by a principal ray of the image light irradiated onto the front surface of the screen. The angle β is obtained when the reflectivity of light, having a polarization direction parallel to a plane including image light irradiated onto the front surface of the screen and a normal of the front surface of the screen, to the front surface of the screen is minimum.

In this structure, light having a polarization direction parallel to a plane including image light irradiated onto the front surface of the screen and onto a normal of a front surface of the screen is irradiated at an angle including the angle β at which the reflectivity to a normal of a front surface of the screen at the front surface of the screen is low.

In a rear projection display device of this invention, the relationship of j-min<β<j-max is satisfied, where an angle of a maximum value (j-max) and a minimum value (j-min) is formed by a normal of the front surface of the screen and by a principal ray of the image light irradiated onto the front surface of the screen. The angle β is obtained when the reflectivity of light, having a polarization direction parallel to the plane including image light irradiated onto the front surface of the screen and onto a normal of the front surface of the screen, to the front surface of the screen is minimum.

In this structure, light having a polarization direction parallel to a plane including image light irradiated onto the front surface of the screen and a normal of the front surface of the screen is irradiated on a front surface of the screen at an angle including the angle β at which the reflectivity to a normal of a front surface of the screen at the front surface of the screen is low.

The screen includes a fresnel lens and the front surface of the screen is an inclined surface with a ring body shaped protrusion of the fresnel lens.

The polarization direction of at least the green component from the image light irradiated onto the screen is parallel to a plane including image light irradiated onto a back surface of the screen and onto a normal of the back surface of the screen.

When a polarization direction of the green component is made parallel to a plane including image light irradiated onto the front surface of the screen and a normal of the front surface of the screen, less image light is reflected and lost on a back surface of the screen.

The foregoing and other objects, features, aspects and advantages of the present invention will become more apparent from the following detailed description of the present invention in conjunction with the accompanying drawings.

DESCRIPTION OF THE PREFERRED EMBODIMENT

Explanation of one of the embodiments of a rear projection display device according to the present invention is made by referring to the drawings. In the following description, a coordinate system where a width direction of a rectangular screen 7 is taken along an x-axis, a height direction of the screen 7 is taken along a y-axis, and a perpendicular direction to the screen 7 is taken along a z-axis.

Figure 1:
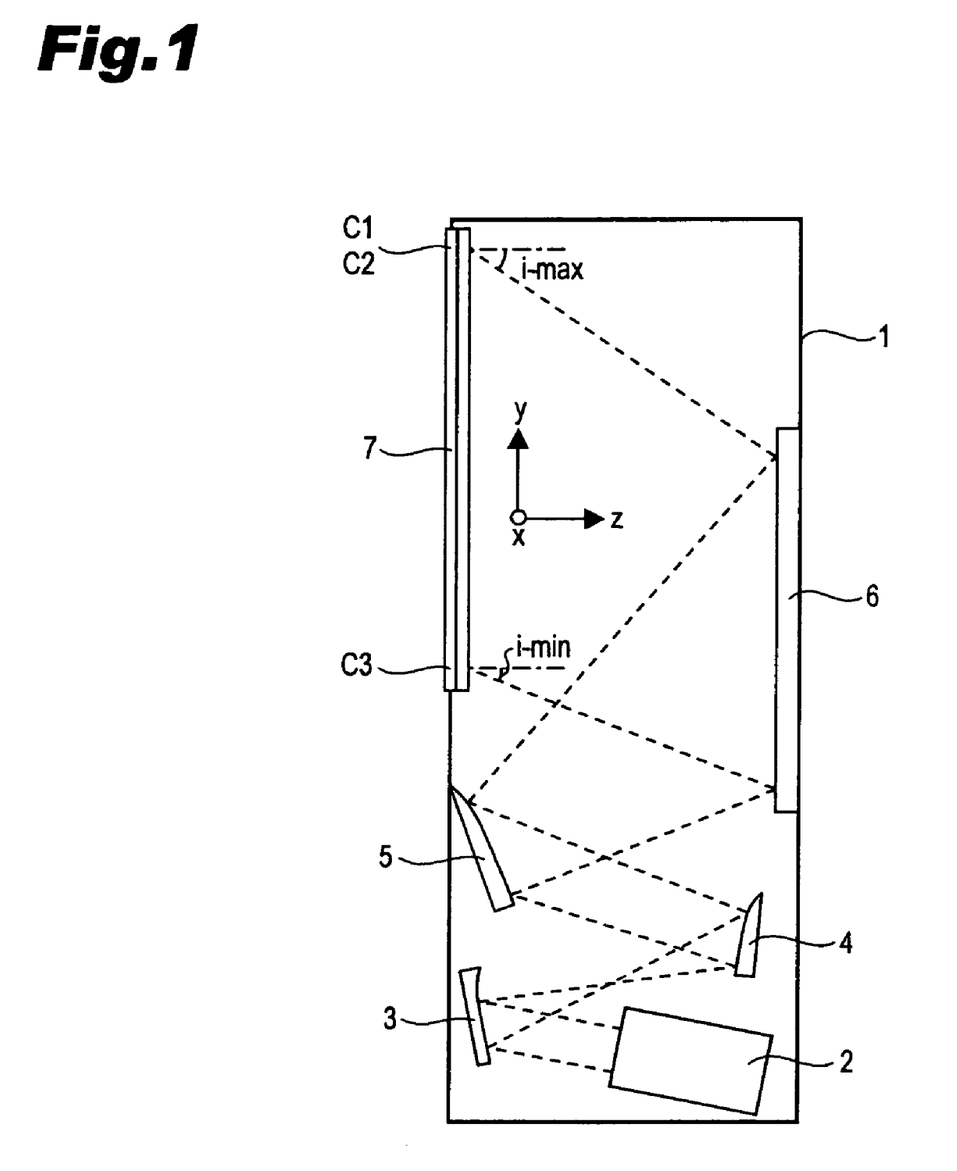
FIG. 1 is a cross sectional view illustrating a structure of a rear projection display device of one embodiment according to the present invention.
Figure 2:
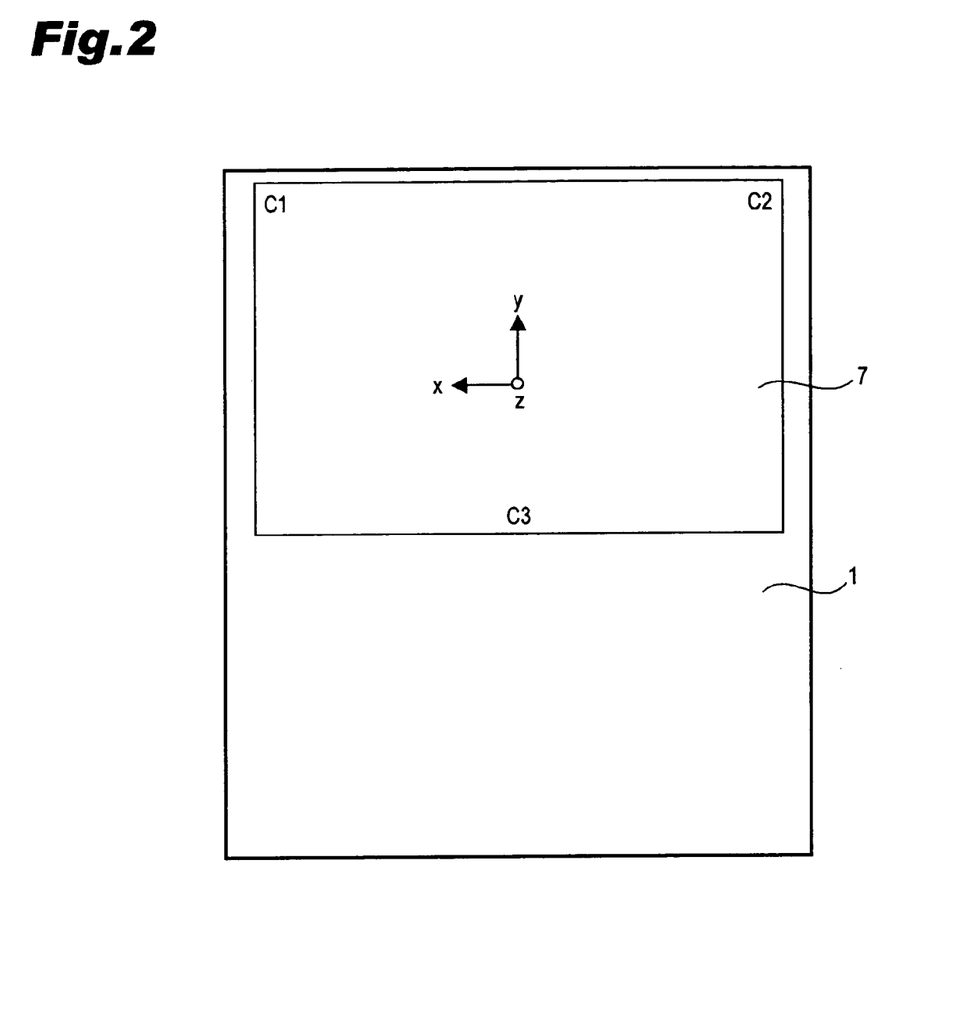
FIG. 2 is a front elevation of the rear projection display device of FIG. 1.
Figure 3:
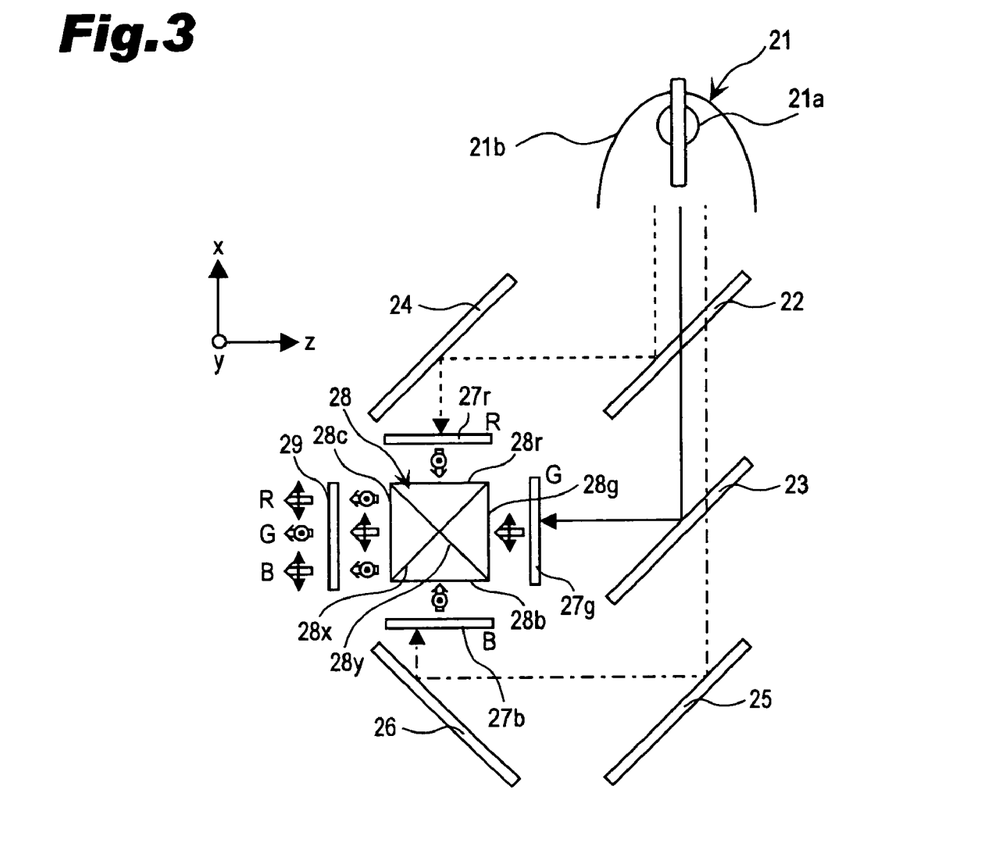
FIG. 3 is a top plan view illustrating a projection unit of the rear projection display device of FIG. 1.
Figure 4:
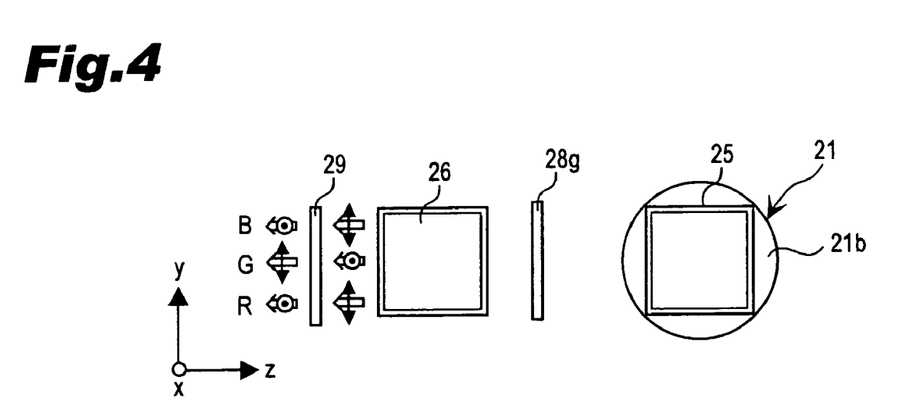
FIG. 4 is a side view of the projection unit of FIG. 3.
Figure 5:
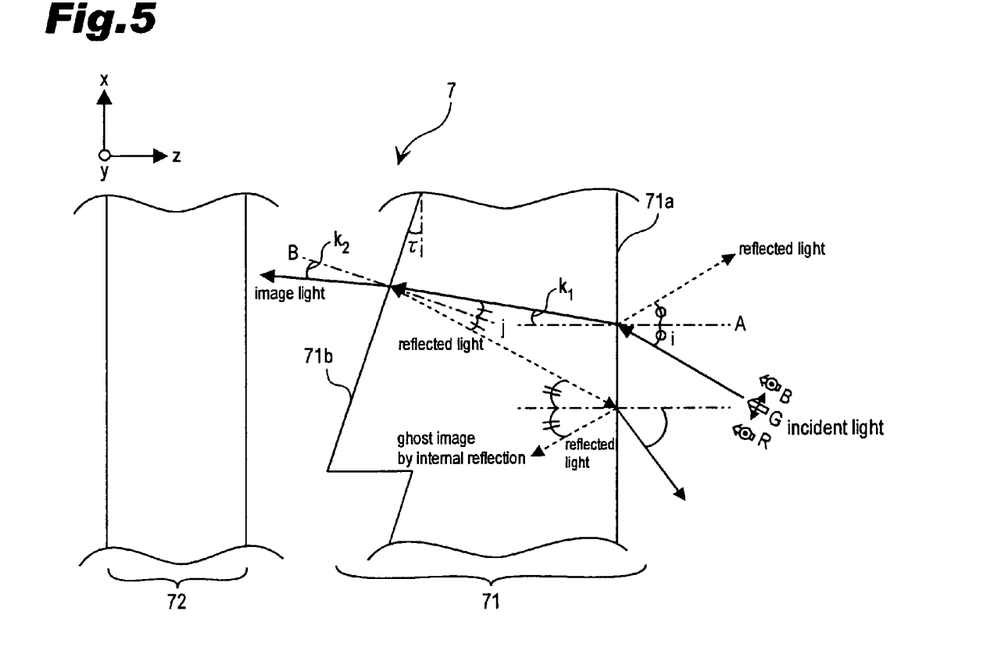
FIG. 5 is an enlarged segmentary sectional view of a screen of the rear projection display device of FIG. 1.
Figure 7:
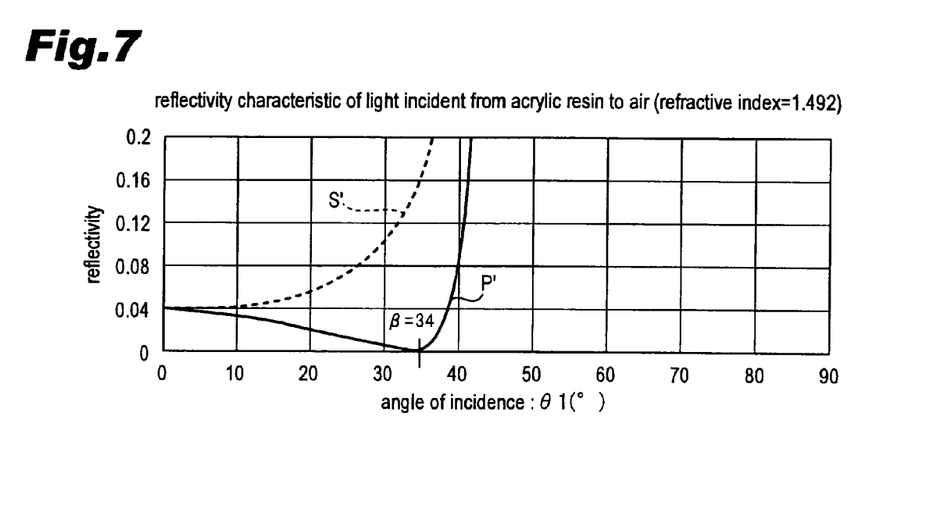
FIG. 7 is a graph of the reflectivity characteristic of light emitted from the acrylic resin to the air.

In this embodiment, FIG. 1 is a cross sectional view of the rear projection display device, and FIG. 2 is a front elevation of the device. FIGS. 3, 4 illustrate a structure of a projection unit in the rear projection display device of FIG. 1, wherein FIG. 3 is a top plan view, and FIG. 4 is a side view. FIG. 5 is an enlarged segmentary sectional view of a screen of the rear projection display device of FIG. 1. FIG. 6 is a graph of the reflectivity characteristic of light incident to acrylic resin from the air, and FIG. 7 is a graph of the reflectivity characteristic of light emitted from the acrylic resin to the air. FIG. 8 is a graph of spectral luminous efficiency characteristics of a man.

As shown in FIG. 1, a rear projection display device of this invention includes a projection unit 2 for producing image light, a screen 7 for forming a picture when the image light is projected thereon, four mirrors 3–6 for introducing the image light emitted from the projection unit 2 to the screen 7, and a body 1 for housing these elements therein.

An image forming system is composed of the first-third mirrors 3–5. The first mirror 3 has an aspherical concave shape, the second and third mirrors 4, 5 have aspherical convex shapes. The shapes of the mirrors in the image forming system ensure corrections of aberration, such as astigmatism, coma, and also ensure magnifications of the image light. The image light emitted from the projection unit 2 is successively reflected on the first-third mirrors 3–5, and is irradiated on the fourth mirror 6 which is arranged on the internal back surface of the body 1. The image light irradiated on the fourth mirror 6, which is of a flat plate shape, is irradiated from slantly behind on a back surface of the screen 7 which is arranged on a front opening of the body 1. A picture is thereby formed.

As shown in FIG. 3, the projection unit 2 is one of three-plate type. A light source 21 comprises a reflector 21*b* and a metal halide lamp 21*a*. White light emitted from the light source 21 is splited into three colors of light by dichroic mirrors 22, 23. The first dichroic mirror 22 selectively reflects red light out of the white light emitted from the metal halide lamp 21*a* and transmits light of other color components. The second dichroic mirror 23 selectively reflects green light and transmits light of other color components.

The white light emitted from the metal halide lamp 21*a* is reflected on the reflector 21*b*. Then, ultra violet ray and infrared ray in the light are eliminated at an UV/IR filter (not shown), and the white light is irradiated to the first dichroic mirror 22 at an angle of 45°. Red light reflected on the first dichroic mirror 22 is introduced to the first liquid crystal panel 27*r* for the red light by the first reflecting mirror 24. The light transmitted through the first dichroic mirror 22 is irradiated on the second dichroic mirror 23 at an angle of 45°. Green light from the light transmitted through the first dichroic mirror 22 is selectively reflected on the second dichroic mirror 23 and is introduced to the second liquid crystal panel 27*g* for the green light.

The blue light, which is the rest of the light transmitted through the second dichroic mirror 23 is successively reflected on the second and third mirrors 25, 26, and is introduced to the third liquid crystal panel 27*b* for the blue light by the second and third reflecting mirrors 25, 26.

The red light introduced to the first liquid crystal panel 27*r* is optically modulated according to the image information of the red component, and is incident to the main surface 28*r* of the dichroic prism 28 for color synthesis. The green light introduced to the second liquid crystal panel 27*g* is optically modulated according to the image information of the green component, and is incident to the main surface 28*g* of the dichroic prism 28 for color synthesis. Similarly, the blue light introduced to the third liquid crystal panel 27*b* is optically modulated according to the image information of the blue component, and is incident to the main surface 28*b* of the dichroic prism 28 for color synthesis.

Light which is S-polarized to a bonded surface 28*x* out of the red light incident to the main surface 28*r* of the dichroic prism 28 (a component which polarization direction is vertical to the x-z plane), is reflected on the bonded surface 28*x*. Light which is P-polarized to the bonded surfaces 28*x*, 28*y* out of the green light incident to the main surface 28*g* of the dichroic prism 28 (a component of which polarization direction is parallel to the x-z plane), is transmitted to the bonded surfaces 28*x*, 28*y*. Light which is S-polarized to the bonded surface 28*y* of the blue light incident to the main surface 28*b* of the dichroic prism 28 (a component of which polarization direction is vertical to the x-z plane), is reflected on the bonded surface 28*y*.

The color light optically modulated by each of the liquid crystal panel 27*r*, 27*g*, and 27*b* corresponding to each color information is color-synthesized by the dichroic prism 28. The color-synthesized image light is emitted from the main surface 28*c* of the dichroic prism 28. The polarization directions of the light is respectively rotated by an angle of 90° at a λ/2 retardation plate 29, and the light is given to the image forming system.

The red light from the image light emitted from the main surface 28c of the dichroic prism 28 is S-polarized light to the bonded surface 28x, the green light is P-polarized light to the bonded surfaces 28x, 28y, and the blue light is S-polarized light to the bonded surface 28y. The polarization directions are respectively rotated by an angle of 90° at the λ/2 retardation plate 29. Subsequently, the red light is turned into P-polarized light to the bonded surface 28x, the green light is turned into S-polarized light to the bonded surfaces 28x, 28y, and the blue light is turned into P-polarized light to the bonded surface 28y.

As shown in FIG. 1, the image light transmitted through the λ/2 retardation plate 29 is successively reflected on the first-third mirrors 3–5 which compose the image forming system, and is irradiated to the fourth mirror 6 arranged on the back surface of the body 1. The shapes of the mirrors in the image forming system ensure corrections of aberration, such as astigmatism, coma, and also ensure magnification of the image light.

The image light irradiated on the flat plate shaped fourth mirror 6 is irradiated to the back surface of the screen 7 from a slant below the screen 7. The red light from the image light irradiated on the back surface of the screen 7 is S-polarized to the screen 7 wherein the polarization direction is vertical to the y-z plane. The green light is P-polarized to the screen 7 wherein the polarization direction is parallel to the y-z plane. Furthermore, the blue light is S-polarized to the screen 7, wherein the polarization direction is vertical to the y-z plane. The y-z plane is a vertical cross section of the screen 7.

As shown in FIG. 5, the screen 7 includes a fresnel lens screen 71 formed with acrylic resin and a lenticular lens screen 72. The image light reflected onto the fourth mirror 6 is irradiated on a back surface 71a of the fresnel lens screen 71.

An angle (i) formed by a normal A to the back surface 71a of the fresnel lens screen 71 and a principal ray of the image light irradiated thereon is i-max at maximum at upper corners C1, C2 of the fresnel lens screen 71 (see FIG. 1), and is i-min at minimum at a lower corner C3 (see FIG. 1). In this embodiment, the first-fourth mirrors 3–6 are set so that i-max is 58.27°, and i-min is 32.27°.

FIG. 6 is a graph for showing the reflectivity characteristic of light incident to acrylic resin from the air. In this case, the refractivity of the air is 1.00, and the refractivity of the acrylic resin is 1.492. When the image light is irradiated on a slant to the screen 7, it means that the light is incident at a certain angle of incidence from the air to the acrylic resin.

The reflectivity of light irradiated to the acrylic resin, which forms the fresnel lens screen 71, from the air varies depending on an angle of incidence θ1, an angle formed by the light irradiated to the acrylic resin and a normal of the acrylic resin at a point where the light is irradiated. The broken line in FIG. 6 illustrates reflectivity tends to increase as the angle θ1 increases. The broken line in FIG. 6 pertains to the reflectivity characteristic S of light of which polarization direction is vertical to a plane including light irradiated to the acrylic resin and the normal of the acrylic resin at a point where the light is irradiated. On the other hand, the full line illustrates that as the angle θ1 is close to the minimum value α, the reflectivity reduces. The full line pertains to the reflectivity characteristic P of light of which polarization direction is parallel to a plane including light irradiated to the acrylic resin at a point where the light is irradiated. The angle α of the minimum value is an angle when the P-component of the reflected light is zero and that the reflected light is a plane polarized light. The angle of incidence is referred as polarization angle. The polarization angle α is expressed by the expression 1 below where the refractivity at both ends of the boundary is defined as n1, n2.

$$\tan \alpha = n2/n1 \quad \text{[Expression 1]}$$

To be concrete, an angle α is approximately 56° according to the above expression when the light is incident to the acrylic resin from the air.

As indicated by the broken line in FIG. 6, the reflectivity to the screen 7 of the red light and blue light as S-polarized light from the image light irradiated to the back surface 71a of the fresnel lens screen 71, is higher than the reflectivity of the light irradiated parallel to the normal A of the screen 7, and therefore the light utilization efficiency decreases. However, as indicated by the full line in FIG. 6, the reflectivity of the green light as P-polarized light to the screen 7 from the image light irradiated on the back surface 71a of the fresnel lens screen 71, is lower than the reflectivity of the light irradiated parallel to the normal A of the screen 7, and therefore the light utilization efficiency increases.

It is generally known that a man recognizes the brightness of the green light as compared with the red and blue lights. A man may detect light at the wavelength 555 nm which corresponds to the green color which is the brightest of all colors (the visibility is high). FIG. 8 indicates the visibility of various wavelengths, wherein the visibility at the wavelength 555 nm corresponds to the green light. When the visibility of the green light is at one (1) of the spectral luminous efficiency, the visibility of the wavelength at 630 nm corresponding to the red light is approximately 0.265, and the visibility of the wavelength at 470 nm corresponding to the blue light is approximately 0.091.

As mentioned above, when the image light is irradiated onto the screen 7 on a slant, the visibility of the green light is remarkably higher than those of the red and blue light. The lowered brightness caused by the S-polarized red and blue light to the screen 7 can be compensated by making the brightness of the P-polarized green light higher, increasing the brightness as a whole. In conjunction with the increased brightness, light reflected onto the back surface 71a of the fresnel lens screen 71 thereby decreases, and a ghost caused by the reflected light can be reduced, which improves the image quality. It is preferred that all the component of light be P-polarized light when directed to the screen 7.

An angle (i) is formed by a principal ray of the image light irradiated onto the screen 7 and the normal A of the screen 7. The angle (i) is set to satisfy the below expression 2. Therefore, the utilization efficiency of P-polarized light component can be improved, leading to higher brightness.

$$i\text{-min} < \alpha < i\text{-max} \quad \text{[Expression 2]}$$

The image light transmitted through the back surface 71a of the fresnel lens screen 71 is refracted on the back surface 71a at an angle k1 corresponding to the Snel principle, and is then irradiated to a protruded inclined surface 71b formed in a ring body shape on an emitting side of the fresnel lens screen 71.

An angle of an inclined surface 71b is set so that an angle (j), which is formed by a normal B to the inclined surface 71b of the fresnel lens screen 71 and a principal ray of the image light irradiated to the screen 71, is j-max at maximum and j-min at minimum on each protruded inclined surface 71b of the fresnel lens screen 71. In this embodiment, an inclination τ of each inclined surface 71b is set so that j-max is 38.36° and j-min is 22.57°.

As shown in FIG. 7, the reflectivity of light emitted from the acrylic resin to the air varies depending on an angle θ2 which is formed by the light traveling in the acrylic resin and the normal acrylic resin at a point where the light is emitted. The broken line in FIG. 7 illustrates that the reflectivity increases as the θ2 increases. The broken line also pertains to the reflectivity characteristic S of light of which polarization direction is vertical to a plane including the light traveling in the acrylic resin and the normal of the acrylic resin at a point where the light is emitted. On the other hand, the full line illustrates that the reflectivity decreases as the angle θ2 is made close to the minimum polarization angle β. The full line also pertains to the reflectivity characteristic P' of light of which polarization direction is parallel to a plane including the light traveling in the acrylic resin and the normal of the acrylic resin at a point where the light is emitted. When the light is emitted from the acrylic resin to the air, the angle β is approximately 34° according to the expression 1.

As indicated by a broken line S' in FIG. 7, the reflectivity of the red and blue light, which is S-polarized to the screen 7 from the image light irradiated to the inclined surface 71b with a ring body shaped protrusion on the emission side of the fresnel lens screen 71, is higher than the reflectivity of light irradiated in parallel to the normal B of the inclined surface 71b, thereby lowering the light utilization efficiency. However, as indicated by the full line P' in FIG. 7, the reflectivity of the green light, which is P-polarized to the screen 7 from the image light irradiated to the inclined surface 71b, is lower than the reflectivity of light irradiated parallel to the normal B of the inclined surface 71b, thereby increasing the light utilization efficiency.

In the case where the image light is irradiated onto the back surface 71a of the fresnel lens screen 71 from the air, the lowered brightness caused by the S-polarized red and blue light to the screen 7 is compensated by the increased brightness of the P-polarized green light to the screen 7, and thereby improving the brightness as a whole. Reflected light at the inclined surface 71b of the fresnel lens screen 71 is reduced, and a ghost produced by the reflected light can also be reduced. Therefore, the image quality can be improved. It is preferred that all the color components be P-polarized light.

An angle (j), which is formed by the principal ray of the image light irradiated onto the inclined surface 71b of the screen 7 and the normal B of the inclined surface 71b, satisfies the expression 3 below. Therefore, the light utilization efficiency of P-polarized light component itself can be improved, leading to higher brightness.

$$j\text{-min} < \beta < j\text{-max} \qquad \text{[Expression 3]}$$

Image light is transmitted through the inclined surface 71b of the fresnel lens screen 7 and is refracted onto the inclined surface 71b at an angle k2 according to the Snel principle. Thereafter, the image light is irradiated to the lenticular lens screen 72. Then, a picture is formed by the diffusing action of the lenticular lens screen 72.

In this embodiment, the image light is irradiated from behind the screen 7 on a slant. The image light may be irradiated from the side of the screen 7 on a slant. In this case, the green light is adjusted so as to be P-polarized light to the screen 7, wherein the polarization direction is parallel to the x-z plane.

In this embodiment, the polarization direction of the green light is adjusted so that it is parallel to the y-z plane. It is preferred that the polarization direction be parallel to a plane including a principal ray of the image light and the normal of a part at a point where the image light is irradiated.

In this embodiment, the polarization direction of the green light is adjusted so that the light turns from S-polarized light into P-polarized light and is reflected to the screen 7 by the λ/2 retardation plate 29. In other case, a narrow band retardation plate may be used for selectively adjusting the polarization direction of the green light so that the light turns from S-polarized light into P-polarized light. In this case, polarization directions of the red and blue light do not change, and therefore, all the image light may be P-polarized light onto the screen 7.

In this embodiment, the image forming system is composed of the first-third mirrors 3–5. The same effect can be gained when using a lens system.

This invention can reduce reflection on a screen and can improve the brightness by making at least the green component light P-polarized light onto a screen when image light is irradiated to the screen on a slant. Furthermore, a ghost phenomenon caused by reflected light on the screen is prevented, and therefore, the image quality can be improved.

Although the present invention has been described and illustrated in detail, it is clearly understood that the same is for example only and is not to be taken to be limiting. The spirit and scope of the present invention being limited only by the terms of the appended claims.

What is claimed is:

1. A rear projection display device comprising a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for projecting image light which is color-synthesized by the color synthesizing means on a screen from slantly above or slantly below, wherein a polarization direction of at least one color component out of the image light irradiated on the screen is parallel to a vertical cross section of the screen, and the polarization direction of the at least one color component is manipulated to reduce reflection on the screen and to improve brightness, wherein the polarization direction of at least the green component out of the image light irradiated on the screen is parallel to the vertical cross section of the screen, wherein polarization direction adjusting means is provided for adjusting a polarization direction of at least the green component out of the image light synthesized by the color synthesizing means so that the polarization direction of at least the green component is parallel to the vertical cross section of the screen.

2. A rear projection display device comprising a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for projecting image light which is color-synthesized by the color synthesizing means on a screen from slantly above or slantly below, wherein a polarization direction of at least one color component out of the image light irradiated on the screen is parallel to a vertical cross section of the screen, and the polarization direction of the at least one color component is manipulated to reduce reflection on the screen and to improve brightness, wherein the polarization direction of at least the green component out of the image light irradiated on the screen is parallel to the vertical cross section of the screen, wherein polarization direction adjusting means is provided for adjusting a polarization direction of at least the green component out of the image light synthesized by the color synthesizing means so that the polarization direction of at least the green component is parallel to the vertical cross section of the screen, wherein the polarization direction adjusting means comprises a retardation plate.

3. A rear projection display device comprising a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for projecting image light which is color-synthesized by the color synthesizing means on a screen from slantly above or slantly below, wherein a polarization direction of at least one color component out of the image light irradiated on the screen is parallel to a vertical cross section of the screen, and the polarization direction of the at least one color component is manipulated to reduce reflection on the screen and to improve brightness, wherein polarization directions of all the color components of the image light irradiated on the screen are parallel to the vertical cross section of the screen, wherein polarization direction adjusting means is provided for selectively adjusting a color component, of which a polarization direction is orthogonal with the vertical cross section of the screen, out of the image light synthesized by the color synthesizing means so that the polarization direction of the color component is parallel to the vertical cross section of the screen.

4. A rear projection display device comprising a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for projecting image light which is color-synthesized by the color synthesizing means on a screen from slantly above or slantly below, wherein a polarization direction of at least one color component out of the image light irradiated on the screen is parallel to a vertical cross section of the screen, and the polarization direction of the at least one color component is manipulated to reduce reflection on the screen and to improve brightness, wherein polarization directions of all the color components of the image light irradiated on the screen are parallel to the vertical cross section of the screen, wherein polarization direction adjusting means is provided for selectively adjusting a color component, of which a polarization direction is orthogonal with the vertical cross section of the screen, out of the image light synthesized by the color synthesizing means so that the polarization direction of the color component is parallel to the vertical cross section of the screen, wherein the polarization direction adjusting means comprises a narrow band retardation plate.

5. A rear projection display device comprising a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for projecting image light which is color-synthesized by the color synthesizing means on a screen from a slant side, wherein a polarization direction of at least one color component out of the image light irradiated on the screen is parallel to a horizontal cross section of the screen, and the polarization direction of the at least one color component is manipulated to reduce reflection on the screen and to improve brightness, wherein at least one of the color components is green, wherein polarization direction adjusting means is provided for adjusting a polarization direction of at least the green component out of the image light irradiated on the screen so that the polarization direction of at least the green component is parallel to the horizontal cross section of the screen.

6. A rear projection display device comprising a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for projecting image light which is color-synthesized by the color synthesizing means on a screen from a slant side, wherein a polarization direction of at least one color component out of the image light irradiated on the screen is parallel to a horizontal cross section of the screen, and the polarization direction of the at least one color component is manipulated to reduce reflection on the screen and to improve brightness, wherein at least one of the color components is green, wherein polarization direction adjusting means is provided for adjusting a polarization direction of at least the green component out of the image light irradiated on the screen so that the polarization direction of at least the green component is parallel to the horizontal cross section of the screen, wherein the polarization direction adjusting means comprises a retardation plate.

7. A rear projection display device comprising a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for projecting image light which is color-synthesized by the color synthesizing means on a screen from a slant side, wherein a polarization direction of at least one color component out of the image light irradiated on the screen is parallel to a horizontal cross section of the screen, and the polarization direction of the at least one color component is manipulated to reduce reflection on the screen and to improve brightness, wherein polarization directions of all the color components of the image light irradiated on the screen are parallel to the horizontal cross section of the screen, wherein polarization direction adjusting means is provided for selectively adjusting a color component, of which polarization direction is orthogonal with the horizontal cross section of the screen, out of the image light synthesized by the color synthesizing means so that the polarization direction of the color component is parallel to the horizontal cross section of the screen.

8. A rear projection display device comprising a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for projecting image light which is color-synthesized by the color synthesizing means on a screen from a slant side, wherein a polarization direction of at least one color component out of the image light irradiated on the screen is parallel to a horizontal cross section of the screen, and the polarization direction of the at least one color component is manipulated to reduce reflection on the screen and to improve brightness, wherein polarization directions of all the color components of the image light irradiated on the screen are parallel to the horizontal cross section of the screen, wherein polarization direction adjusting means is provided for selectively adjusting a color component, of which polarization direction is orthogonal with the horizontal cross section of the screen, out of the image light synthesized by the color synthesizing means so that the polarization direction of the color component is parallel to the horizontal cross section of the screen, wherein the polarization direction adjusting means comprises a narrow band retardation plate.

9. A rear projection display device comprising a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for slantly projecting image light which is color-synthesized by the color synthesizing means on a screen, wherein a polarization direction of at least one color component out of the image light irradiated on the screen is parallel to a plane including the image light irradiated on the screen and a normal of the screen, and the polarization direction of the at least one color component is manipulated to reduce reflection on the screen and to improve brightness, wherein at least one of the color components is green, wherein polarization direction adjusting means is provided for adjusting a polarization direction of at least the green component out of the image light irradiated on the screen so that the polarization direction of at least the green component is parallel to the plane including the image light irradiated on the screen and the normal of the screen.

10. A rear projection display device comprising a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for slantly projecting image light which is color-synthesized by the color synthesizing means on a screen, wherein a polarization direction of at least one color component out of the image light irradiated on the screen is parallel to a plane including the image light irradiated on the screen and a normal of the screen, and the polarization direction of the at least one color component is manipulated to reduce reflection on the screen and to improve brightness, wherein at least one of the color components is green, wherein polarization direction adjusting means is provided for adjusting a polarization direction of at least the green component out of the image light irradiated on the screen so that the polarization direction of at least the green component is parallel to the plane including the image light irradiated on the screen and the normal of the screen, wherein the polarization direction adjusting means comprises a retardation plate.

11. A rear projection display device comprising a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for slantly projecting image light which is color-synthesized by the color synthesizing means on a screen, wherein a polarization direction of at least one color component out of the image light irradiated on the screen is parallel to a plane including the image light irradiated on the screen and a normal of the screen, and the polarization direction of the at least one color component is manipulated to reduce reflection on the screen and to improve brightness, wherein polarization directions of all the color components of the image light irradiated on the screen are parallel to the plane including the image light irradiated on the screen and the normal of the screen, wherein polarization direction adjusting means is provided for selectively adjusting a color component, of which a polarization direction is orthogonal with the plane including the image light irradiated on the screen and the normal of the screen, out of the image light synthesized by the color synthesizing means so that the polarization direction of the color component is parallel to the plane.

12. A rear projection display device comprising a light source lamp, color splitting means for splitting light emitted from the light source lamp into a plurality of color components, a plurality of liquid crystal panels for optically modulating each color light split by the color splitting means, color synthesizing means for synthesizing each of the color light modulated by the liquid crystal panels, and projection means for slantly projecting image light which is color-synthesized by the color synthesizing means on a screen, wherein a polarization direction of at least one color component out of the image light irradiated on the screen is parallel to a plane including the image light irradiated on the screen and a normal of the screen, and the polarization direction of the at least one color component is manipulated to reduce reflection on the screen and to improve brightness, wherein polarization directions of all the color components of the image light irradiated on the screen are parallel to the plane including the image light irradiated on the screen and the normal of the screen, wherein polarization direction adjusting means is provided for selectively adjusting a color component, of which a polarization direction is orthogonal with the plane including the image light irradiated on the screen and the normal of the screen, out of the image light synthesized by the color synthesizing means so that the polarization direction of the color component is parallel to the plane, wherein the polarization direction adjusting means comprises a narrow band retardation plate.

13. A rear projection display device comprising:

a light source lamp, color splitting means for splitting light emitted from the light source lamp into tree color components of red, green and blue, a plurality of liquid crystal panels for optically modulating each color light split by the color splitting means, color synthesizing means for synthesizing each of the color light modulated by the liquid crystal panels, polarization direction adjusting means for selectively adjusting a color component which is an S-polarized component to a surface of a screen on which image light is irradiated, out of the image light synthesized by the color synthesizing means so that the S-polarized component becomes a P-polarized component to the surface of the screen on which the image light is irradiated, and projection means for slantly projecting image light which is color-synthesized by the color synthesizing means on a screen, wherein all color components out of the image light irradiated on the screen are P-polarized to the surface of the screen on which the image light is irradiated.

14. The rear projection display device according to claim 13, wherein the polarization direction adjusting means comprises a narrow band retardation plate.

15. The rear projection display device according to claim 13, wherein the relation i-min<$\alpha$<i-max is satisfied, where an angle of a maximum value i-max and a minimum value i-min is formed by a normal of a back surface of the screen and a principal ray of the image light irradiated on the back surface of the screen, and an angle $\alpha$ is obtained when the reflectivity of light, which is P-polarized to the surface on which the image light is irradiated, to the back surface of the screen is minimum.

16. The rear projection display device according to claim 13, wherein the relation j-min<$\beta$<j-max is satisfied, where an angle of a maximum value j-max and a minimum value j-min is formed by a normal of a front surface of the screen and a principal ray of the image light irradiated on the front surface of the screen, and an angle $\beta$ is obtained when the reflectivity of light, which is P-polarized to the surface of the screen on which the image light is irradiated, to the front surface of the screen is minimum.

* * * * *